United States Patent
Rennard et al.

(10) Patent No.: US 9,598,299 B2
(45) Date of Patent: Mar. 21, 2017

(54) FLOATING WICKS FOR SLURRY CONSOLIDATION

(71) Applicants: David C. Rennard, Houston, TX (US); Thomas R. Palmer, Calgary (CA); Scott R. Clingman, Houston, TX (US); Robert D. Kaminsky, Houston, TX (US)

(72) Inventors: David C. Rennard, Houston, TX (US); Thomas R. Palmer, Calgary (CA); Scott R. Clingman, Houston, TX (US); Robert D. Kaminsky, Houston, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 1044 days.

(21) Appl. No.: 13/720,958

(22) Filed: Dec. 19, 2012

(65) Prior Publication Data

US 2014/0069867 A1     Mar. 13, 2014

Related U.S. Application Data

(60) Provisional application No. 61/699,681, filed on Sep. 11, 2012.

(51) Int. Cl.
| | |
|---|---|
| C02F 1/12 | (2006.01) |
| C02F 11/12 | (2006.01) |
| C10G 1/04 | (2006.01) |
| E21C 41/26 | (2006.01) |
| C10G 33/06 | (2006.01) |
| C02F 103/10 | (2006.01) |
| C02F 11/16 | (2006.01) |

(52) U.S. Cl.
CPC .............. *C02F 11/121* (2013.01); *C10G 1/04* (2013.01); *C10G 33/06* (2013.01); *E21C 41/31* (2013.01); *C02F 11/16* (2013.01); *C02F 2103/10* (2013.01)

(58) Field of Classification Search
None
See application file for complete search history.

(56) References Cited

U.S. PATENT DOCUMENTS 4,749,479 A * 6/1988 Gray ...................... B01D 24/26
                                                                            210/170.08
4,883,589 A * 11/1989 Konon ............... B01D 17/0202
                                                                            210/140

OTHER PUBLICATIONS

Bell, B. et al. (2007) "St. Luis River/Interlake/Duluth Tar Site Remediation, Sediment Operable Unit—2006 Sand Cap/Surcharge Project, Duluth, Minnesota" *WODCON* Conference, 2007.
Olauson, E., et al. (2010) "Sand Capping of Weak Tailings at Suncor's Pond 1", *Tailings and Mine Waste 2010*, Edited by The Organizing Committee of the 14th International Conference on Tailings and Mine Waste, CRC Press 2010, pp. 393-400, Print ISBN: 978-0-415-61455-9.

(Continued)

*Primary Examiner* — Terry Cecil
(74) *Attorney, Agent, or Firm* — ExxonMobil Upstream Research Company Law Dept.

(57) ABSTRACT

Systems and methods for remediating an initially liquid-like slurry pond include distributing one or more floating wicks into the slurry pond, wherein the slurry pond includes a slurry with a supernatant level above the slurry. A method also includes placing a load on the slurry, wherein the load causes an effective stress on the slurry and aids in dewatering the slurry.

15 Claims, 5 Drawing Sheets

(56) References Cited

OTHER PUBLICATIONS

Wells, P.S. et al. (2010) "Suncor Pond 5 Coke Cap—The story of its conception, testing, and advance to full-scale construction," *Tailings and Mine Waste 2010 Conference Proceedings*, 2010.

\* cited by examiner

FLOATING WICKS FOR SLURRY CONSOLIDATION

CROSS-REFERENCE TO RELATED APPLICATION

This application claims the priority benefit of U.S. Provisional Patent Application 61/699,681 filed Sep. 11, 2012 entitled FLOATING WICKS FOR SLURRY CONSOLIDATION, the entirety of which is incorporated by reference herein.

FIELD

The present techniques provide for the remediation of slurry ponds through dewatering. More specifically, the techniques provide for dewatering initially fluid-like slurries using a wick.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Mining operations typically utilize an extraction process that results in a product and a nonproduct stream. The nonproduct stream is often referred to as "tailings." When a liquid is included within the extraction process, this can result in fluid tailings that are to be stored in suitable enclosures. In the case of oil sands mining, these tailings form tailings ponds in which fine particles settle over a period of several years to form a stable suspension of 30 weight percent (wt %) solids in water. This suspension is known as mature fine tailings (MFT). The accumulation of MFT on a massive scale has resulted in legislation in Alberta, Canada to form trafficable tailings deposits, i.e., to dewater tailings and ultimately allow reclamation activities upon mine closure.

At present, there are several techniques for dewatering tailings, but they have relatively high costs. These high costs are driven by materials handling issues, technology operating issues, and capital costs, as well as the cost of setting aside Designated Disposal Areas (DDA) of the mine site for tailings dewatering activities. Mining operations that produce plentiful fluid tailings may involve the dedication of an area of land of significant surface area to DDAs. This can sterilize ore or pose higher costs for extraction due to subsequent materials handling.

Currently, the leading technologies for dewatering tailings include a composite tailings (CT) process, a centrifuge process, a thickened tailings process, and an in-line flocculation process. The CT process works by combining mature fine tailings (MFT) and sand with a coagulant to form a non-segregating mixture. Tailings are often flocculated to form thickened tailings, instead of mature fine tailings, and then used in the production of composite tailings. In either case, the mixture is placed in a deposition cell and allowed to dewater over time. Unfortunately, composite tailings are sensitive to shear, which causes sand to separate from fines, resulting in "off-spec composite tailings." Because off-spec composite tailings dewater very slowly, off-spec composite tailings are stored in tailings ponds. Because of the addition of sand, the volume of composite tailings is often much greater than the volume of the original MFT, resulting in higher storage costs for off-spec composite tailings that dewater slowly.

The CT process fails when desegregation of the sand and fines occurs. Such desegregation may cause the fines to float to the top as the sand sinks to the bottom. The CT process succeeds when the sand stays within the viscous fines fluid and adds extra weight to the fluid, inducing dewatering and consolidation. When the sand sinks through the fluid, consolidation of the fines cannot be further induced by the effective stress of the sand load.

Centrifuges are commercially available devices that dewater tailings based on density differences. Rotation causes centripetal force, which induces higher density material to move to the edges, while lower density material, e.g., water, moves to the middle. This separation enables the densification of tailings. Often, centrifugation is combined with a flocculent treatment to make the solids more readily separable. Centrifuges have high operating and capital costs, and do not scale well for deployment in large applications. As a result, many centrifuges may be used for a particular application, resulting in high capital and maintenance expenses.

The thickened tailings process is becoming more common in mining applications. A thickener is a conically-shaped vessel in which tailings are allowed to settle and compact. The thickener compaction zone enables dewatering to occur, but the rates of compaction are often balanced with the degree of compaction and the ability to continue to flow. Thickeners usually make use of flocculation, and often have a rake to provide shear of the consolidating zone. The rake shears the zone to enhance dewatering. Thickeners are often enormous vessels, which contributes to their capital costs. The need for flocculants for treatment also contributes to high operating costs. Furthermore, the limitation of having to move material from the bottom of the thickener limits their application for final dewatering processes.

The in-line flocculation process involves passing tailings through a pipe. While they flow, the tailings are contacted with a flocculant. This flocculant mixes with the tailings in the pipe. Thus, the inflow to the pipe can be untreated tailings, while the outflow is flocculated tailings. This technology often involves higher dosing of flocculant than thickeners, but has the advantage of not requiring a large vessel. Thus, this technology typically has high operating costs and low capital costs.

The above technologies are often coupled with a strategy for deposition of the tailings. Tailings can be deposited in thick lifts, e.g., those that are on the order of about 3-10 meters. If tailings behave like a fluid rather than a solid, thick lifts are contained within a structure, such as a dam, dyke, or toe system. One strategy for enhancing drainage in thick lift deposition involves the application of dug trenches around the perimeter of the deposit, while another strategy involves installing wick drains—typically, a strip or tube of fabric or porous material which allows accelerated capillary, pressure, or gravity drainage of liquids from wet porous solids (e.g., soil).

Thin lift deposition is another option. However, thin lifts, e.g., those that are less than about 1 m, use large tracks of land in order to distribute tailings on dry ground, so that the tailings may dewater before the next lift is deposited. Tailings can be deposited above the water table to enable dewatering by atmospheric drying, drainage, and consolidation, or below the water table, which leverages consolidation but not atmospheric drying.

As mentioned above, wicks have been proposed and used to aid dewatering of thin lift deposition and thick lift deposition methods, which involve laying out wet but semi-consolidated tailings over an area and allowing time for water to drain out and/or to evaporate out of the tailings. The use of wicks to accelerate dewatering however has some drawbacks for these applications. For example, wick placement requires the use of specialized heavy equipment. Furthermore, wicks are not utilized prior to the material gaining at least some strength, i.e. become more solid-like than fluid-like in rheology. This can be because the equipment must drive over the material in order to place the wick, or because the wick would otherwise fill up with high liquid content slurry which could render the wick useless. Also, wicks are often placed fairly closely spaced. All of the above contribute towards the cost of wick installation becoming a large portion of the price of utilizing wick drains in dewatering.

SUMMARY

An exemplary embodiment provides a method for remediating a slurry pond which initially has no or low shear strength. The method includes distributing a one or more wicks over a surface of the slurry pond, wherein the slurry pond includes a supernatant above a slurry. The one or more wicks float in the slurry with one end of the wick at or near the interface between the supernatant and the slurry. The method also includes placing a load on the slurry, wherein the load causes an effective stress on the slurry and accelerates the dewatering of the slurry.

Another exemplary embodiment provides placing a geofabric on the slurry wherein the geofabric is positioned above the one or more wicks and below the load. The wicks may include buoyancy devices so that one end of the wick sinks deep into the slurry and another end of the wick floats in the slurry at or near the interface between the supernatant and the slurry.

DESCRIPTION OF THE DRAWINGS

The advantages of the present techniques are better understood by referring to the following detailed description and the attached drawings, in which.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Bitumen" is a naturally occurring heavy oil material. It is often the hydrocarbon component found in oil sands. Bitumen can vary in composition depending upon the degree of loss of more volatile components. It can vary from a viscous, tar-like, semi-solid material to a solid material. The hydrocarbon types found in bitumen can include aliphatics, aromatics, resins, and asphaltenes. A typical bitumen might be composed of:

19 wt. % aliphatics, which can range from 5 wt. %-30 wt. %, or higher;

19 wt. % asphaltenes, which can range from 5 wt. %-30 wt. %, or higher;

30 wt. % aromatics, which can range from 15 wt. %-50 wt. %, or higher;

32 wt. % resins, which can range from 15 wt. %-50 wt. %, or higher; and some amount of sulfur, which can range in excess of 7 wt. %.

In addition bitumen can contain some water and nitrogen compounds ranging from less than 0.4 wt. % to in excess of 0.7 wt. %. The metals content, while small, can be removed to avoid contamination of the product. Nickel can vary from less than 75 ppm (part per million) to more than 200 ppm. Vanadium can range from less than 200 ppm to more than 500 ppm. The percentage of the hydrocarbon types found in bitumen can vary.

A "development" is a project for the recovery of hydrocarbons using integrated surface facilities and long-term planning. The development can be directed to a single hydrocarbon reservoir, although multiple proximate reservoirs may be included.

As used herein, "exemplary" means "serving as an example, instance, or illustration." Any embodiment described herein as "exemplary" is not to be construed as preferred or advantageous over other embodiments.

As used herein, a "facility," or "plant," is a collection of physical equipment through which hydrocarbons and other fluids may be either produced from a reservoir or injected into a reservoir. A facility may also include equipment which can be used to control production or completion operations. In its broadest sense, the term facility is applied to any equipment that may be present along the flow path between a reservoir and its delivery outlets. Facilities may include production wells, injection wells, well tubulars, wellhead equipment, gathering lines, manifolds, pumps, compressors, separators, surface flow lines, steam generation plants, extraction plants, processing plants, water treatment plants, and delivery outlets. In some instances, the term "surface facility" is used to distinguish those facilities other than wells.

"Heavy oil" includes oils which are classified by the American Petroleum Institute (API) as heavy oils or extra heavy oils. In general, heavy oil has an API gravity between 22.3° (density of 920 kg/m$^3$ or 0.920 g/cm$^3$) and 10.0° (density of 1,000 kg/m$^3$ or 1 g/cm$^3$), or less than 10.0° in some cases. Further, heavy oil with an API gravity of less than 10.0° (density greater than 1,000 kg/m$^3$ or greater than 1 g/cm$^3$) may be termed "extra heavy oil." For example, a source of heavy oil includes oil sand or bituminous sand, which is a combination of clay, sand, water, and bitumen. The thermal recovery of heavy oils is based on the viscosity decrease of fluids with increasing temperature or solvent concentration. Once the viscosity is reduced, the mobilization of fluids by steam, hot water flooding, or gravity is possible. The reduced viscosity makes the drainage quicker and, therefore, directly contributes to the recovery rate.

A "hydrocarbon" is an organic compound that primarily includes the elements hydrogen and carbon, although nitrogen, sulfur, oxygen, metals, or any number of other elements may be present in small amounts. As used herein, hydrocarbons are used to refer to components found in bitumen, or other oil sands.

As used herein, a "fluid slurry" or "slurry" is a liquid containing a solids content which is more than incidental solids debris. Although the percent solids can vary considerably, a slurry sample can have from 2% to 95% by weight of solids. A slurry will possess less than 1 kPa shear strength.

As used herein, a "reservoir" is a subsurface rock or sand formation from which a production fluid can be harvested. The rock formation may include sand, granite, silica, carbonates, clays, and organic matter, such as oil, gas, or coal, among others. Reservoirs can vary in thickness from less than one foot (0.3048 m) to hundreds of feet (hundreds of m).

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

"Tailings" are a waste material generated or obtained in the course of extracting the valuable material, e.g., bitumen, from the non-valuable material, e.g., sand, slurry, or sludge, in extraction operations. "Oil sand fine tailings" are tailings derived from oil sands extraction operations. Such tailings include mature fine tailings (MFT) from tailings ponds and fine tailings from ongoing extraction operations that may bypass a tailings pond, among others. "Flotation tailings" are the waste stream produced from a flotation cell. These tailings are often placed in a holding cell called a tailings pond. After 1-2 years, these tailings will settle to a stable suspension of MFT.

"Sludge," or "tailings sludge," is the portion of sand or other solids that does not settle out but, instead, remain in suspension in the aqueous phase during a bitumen recovery process. A typical analysis of the tailings sludge from a commercial scale plant is nominally 25% solids, e.g., 3% bitumen and 22% other solids, and 75% water. The solids include various constituents, including silica, zircon, mica, kaolinite, montmorillonite, illite and chlorite. The amount of each of these solid constituents varies. However, kaolinite generally constitutes about 50% or more of the total solids. As a result of the inability to obtain effective liquid-solids separation through natural settling action, the problem of tailings disposal becomes progressively more acute as more and more sands are processed, since the aqueous sludge accumulates in direct proportion to the amount of sands processed. Disposal of the tailings presents an environmental challenge. Many solutions to this problem have been proposed, including the use of flocculation, filtration, hydrocyclones and centrifuges, or distillation and freeze-thaw methods, among others.

"Flocculation" is a process wherein colloids are brought out of suspension in the form of "floc" or "flakes" through the addition of a clarifying agent. Flocculation may result in the aggregation of small particles into larger particles.

"Geotextiles," or "geofabrics," are permeable materials that may be used for filtration, separation, or drainage purposes. Geotextiles are typically made from polypropylene or polyester, and may be woven or non-woven. "Geotubes" are tubes or containers that are formed using geotextiles.

"Wick drains" are tubes with a semi permeable wall that permit ingress of liquid, while limiting solids migration into the wick, and provide a pathway for the liquid through an inner channel or along fibers. Capillary forces may draw fluid along the wick. Wick drains often have a plastic substructure that creates a passage for water to move along the long axis of the wick drain.

Overview

Embodiments described herein provide for the remediation of a slurry pond through dewatering. In some embodiments, for example, the methods and system described herein may relate to the dewatering of tailings from the production of oil from oil sands within a tailings pond. In an embodiment, the dewatering of liquid-like slurries, such as, for example, tailings from oil sands mining and extraction, may be accomplished using floating wicking devices to move liquid from deeper in a slurry to shallower in the slurry, such as near the interface of the slurry and the overlying fluid or supernatant. Over time, solids in the slurry will settle into the deeper region and consolidate into a solid-like material and relatively clean fluid or supernatant will accumulate on top of the consolidated solids. In some embodiments, the wick is connected to other wicks. The connection provides a redundant structure and matrix of greater permeable wicks for water removal. In some embodiments, the wicks are self-orienting. This allows the wicks to be placed without specialized equipment. Such wicks can be simply discharged or tossed from a vessel, which could be a floating vessel or even a flying vessel, and will align themselves in the fluid. In some embodiments, the fluid in the slurry pond has less than 1 kPa shear strength. In some embodiments, the fluid in the slurry pond has less than 500 Pa shear strength. In some embodiments, the fluid in the slurry pond has less than 200 Pa shear strength. In yet other embodiments, the fluid in the slurry pond has less than 50 Pa shear strength. In some embodiments, the fluid in the slurry pond has less than 15 Pa shear strength, or even no significant shear strength.

In some embodiments to aid dewatering of the slurry, the slurry may be compressed by adding a weighty material on top of the slurry. This material may include sand or coke. Floating wicks may be placed prior to the addition of the weighty material. In some embodiments, the wick floats with a portion of the wick sticking out of the slurry and into the overlying fluid or supernatant. In this embodiment the application of a load will cause dewatering to occur more rapidly because the water transmitted through the wick proceeds directly into the overlying fluid or supernatant and does not have to travel through the level of sand or coke placed on top of the slurry. In other embodiments, the wick is entirely submerged within the slurry. A preferred mode of these embodiments includes the top of the wick floating very near to the interface between the slurry and the overlying fluid or supernatant.

The dewatering of the tailings may also be accomplished by placing a geotextile over the tailings pond and applying a load, such as sand, on top of the material in order to force the water out of the underlying tailings. Such a method of dewatering tailings within a tailings settling pond provides for flexibility in mine planning because the remediation can occur in pre-existing ponds, requiring a much smaller mine footprint. Floating wicks may also be placed prior to placing the geofabric. In some embodiments, the floating wicks may be attached to the geofabric.

In a preferred embodiment, the wick has a different density on one end than on the other. In this embodiment, the wick orients itself within a fluid, such that the heavier end sinks while the lighter end floats. In a preferred embodiment, the wick is placed in the fluid prior to placing a cap. In some embodiments, the cap comprises a geofabric and a load. In other embodiments, the cap comprises a load without a geofabric.

It is to be understood that, while the embodiments disclosed herein are often discussed in the context of tailings deposited in tailings ponds, the methods and system disclosed herein may be similarly applied to any types of slurries deposited in slurry ponds, such as mine tailings, ash ponds at coal fired power plants, and the like.

According to embodiments disclosed herein, introducing a geotextile between the fluid tailings and the sand prevents the sand from becoming distributed as individual grains. As a result, the sand may evenly apply an effective stress to the underlying fluid tailings. Whether the fluid tailings can penetrate up through the sand depends on the particle size distributions, the size of the pores in the geotextile, and the viscosity and permeability of the fluid. Flocculation may also be used to increase the viscosity of the liquid, making it more difficult for the flocculated tailings to penetrate a small diameter pore. Water, however, may be allowed seep out of the tailings and navigate up through the pores in the geotextile.

The dewatering of tailings often occurs through a variety of mechanisms, including evaporation, drainage, and consolidation. For example, thick lift deposition is the placement of tailings in containment structures such as dykes or toes dams. The tailings are typically placed at depths on the order of 3-10 m. Thick lift deposition takes advantage of consolidation as an increase in stress causes underlying tailings to dewater. Thick lift deposition effectively shuts down evaporation, except at the surface.

Drainage and consolidation are dependent on the hydraulic conductivity of the material to be dewatered, as well as the materials that occupy the pathway through which the water would migrate. In other words, even a highly permeable surface will resist dewatering if it is coated with an impermeable shell. Evaporation is often used for drying. However, when a lift of tailings reaches a high solids concentration, i.e., around 50% to 60% solids, the soils are densified by consolidation rather than evaporation. In other words, a load is placed on top of the soils to compress them. Drying by evaporation or freeze-thaw can occur on the surface of a lift, but the depth of penetration is limited. For this reason, tailings are often dried in thin lifts.

Final capping strategies are commonly implemented above the water table, and tailings are generally dewatered prior to the implementation of such capping strategies. In order for conventional equipment to distribute a geotextile over a deposit and place a load on top of the geotextile, it is first determined that the deposits have a suitable shear strength. For example, the shear strength of low strength muds may be increased using specialized equipment, such as amphiroles, or seasonal considerations, such as waiting for winter to freeze the tailings deep enough to hold conventional equipment, e.g., trucks. The final loading applies an effective stress that enables consolidation of the soil to final volumes, which is required for the land to achieve full settlement. Wicks are then installed through the cap after the load has been placed. This requires sufficient strength to both place the cap and move machinery over the cap for installing the wick.

Wet sand has a greater hydraulic conductivity than dry sand. This indicates that a wet sand cap can consolidate faster than a dry sand cap, since water within the underlying deposit can escape through the sand faster if the sand is wet rather than dry. Furthermore, sand is ineffective at applying an effective stress if the sand falls through the underlying material. Instead, the particles simply rearrange themselves, and the fluid tailings move on top of the sand.

Geotextiles are often used for mining applications, as well as for geotechnical stabilization of landforms. The use of geotextiles in oil sands processes was demonstrated by Suncor (Wells, Caldwell, and Fournier, "Suncor Pond 5 Coke Cap—The story of its conception, testing, and advance to full-scale construction," *Tailings and Mine Waste* 2010 *Conference Proceedings,* 2010). According to Suncor, geotextiles were used for floating a coke cap above composite tailings. Geotextiles were also used at Suncor (E. Olauson, Ibid, 393) for capping soft tailings to enhance strength almost immediately prior to reclamation. In neither instance, however, was a geotextile spread from a barge and sunk onto a subaqueous layer. Furthermore, geotextiles are placed on somewhat consolidated tailings that include high quantities of sand, such as more than equal parts sand and fines, i.e., where fines are less than 44 microns. Such tailings also have higher densities (>1.6) and higher solids concentrations (>45%).

Geotextiles are also routinely applied in subaqueous environments, such as, for example, in lakes, bays, and rivers, as a tool in the engineering of soil mechanics and civil engineering. Examples are given by Bell and Tracy, "St. Luis River/Interlake/Duluth Tar Site Remediation, Sediment Operable Unit—2006 Sand Cap/Surcharge Project," *WODCON Conference,* 2007. According to such examples, contaminated soils or soft soils are dredged, placed to a minor depth, capped with a geotextile, and then capped with sand.

However, in this case, the contaminated soils or soft soils have not been previously treated with a hydrocarbon extraction process. Further, the contaminated soils or soft soils contain no bitumen and are consolidating soils. In contrast, the oil sands fine tailings or other slurries that are utilized according to system and methods described herein form stable suspensions that behave like fluids and include mostly fine particles. The tools of soil mechanics are not applied because of the fluid nature of the tailings. Hydrostatic charging separates individual clays within the suspension, rather than grain-to-grain contact, as is typical in most soil mechanics applications.

Surface Mining Recovery Process

Figure 1:
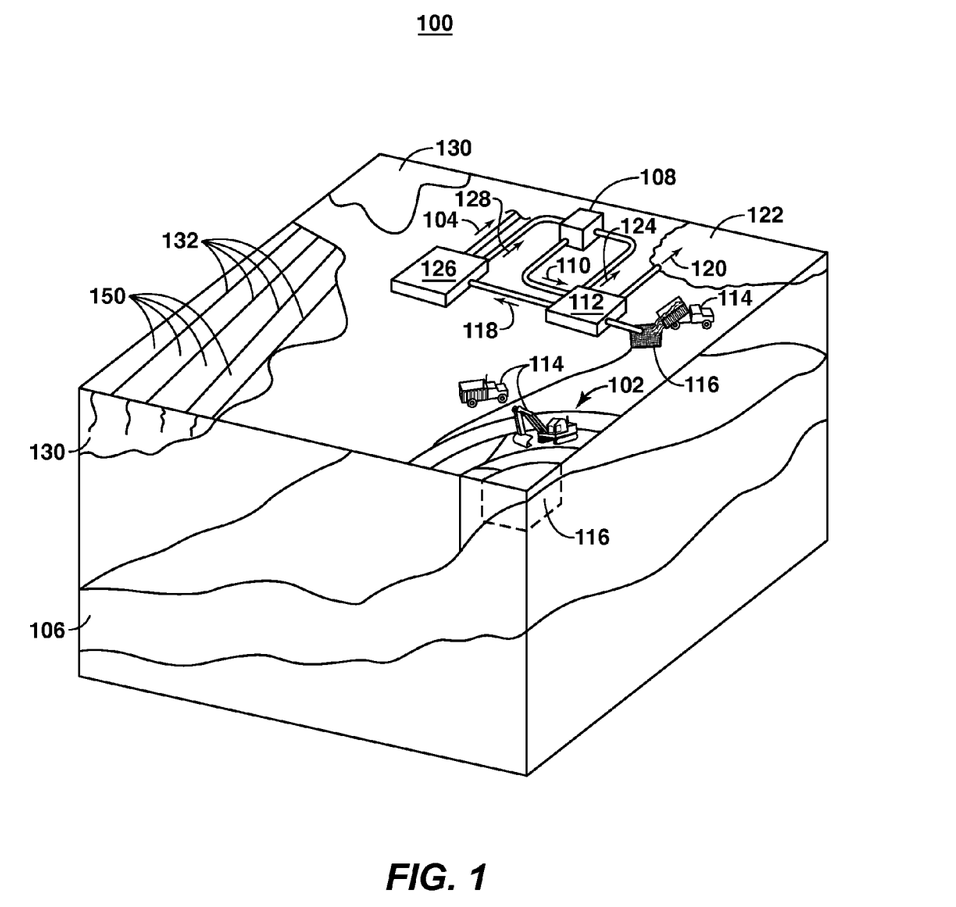
FIG. 1 is a drawing of a development illustrating the use of surface mining to harvest hydrocarbons from a reservoir.

FIG. 1 is a drawing of a development 100 illustrating the use of surface mining 102 to harvest hydrocarbons 104 from a reservoir 106. It will be clear that the techniques described herein are not limited to this combination, or these specific techniques, as any number of techniques or combinations of techniques may be used in embodiments described herein. In the development 100, a steam generation facility 108 is used to generate steam 110, which can be provided to a surface separation facility 112.

The surface mining 102 uses heavy equipment 114 to remove hydrocarbon containing materials 116, such as oil sands, from the reservoir 106. The hydrocarbon containing materials 116 are offloaded at the separation facility 112, where a thermal process, such as a Clark hot water extraction (CHWE), among others, may be used to separate a hydrocarbon stream 118 from a tailings stream 120. The tailings stream 120 may be sent to a tailings pond 122, or may be injected into a sub-surface formation for disposal. A water stream 124 may be recycled to the steam generation facility 108.

The hydrocarbon stream 118 may be sent to a transportation facility 126, which may provide further separation and purification of the incoming hydrocarbon stream 118, prior to sending the marketable hydrocarbons 104 on to further processing facilities. The resulting process water 128 can be returned to the steam generation facility 108 for recycling.

The development 100 may also include a number of previously-filled tailings ponds 130. The previously-filled tailings ponds 130 may contain tailings streams that were previously produced from a separation facility, such as the separation facility 112. In various embodiments, the previously-filled tailings ponds 130 may be covered with sheets of geotextiles 132. The sheets of geotextiles 132 may be used to dewater the tailings streams within the previously-filled tailings ponds 130. For example, a load, such as sand, may be applied on top of the sheets of geotextiles 132 in order to force the supernatant, e.g., water, to move above the sheets of geotextiles 132. In another example, the geotextile has a density between the densities of the slurry and the supernatant, so that the geotextile settles on its own onto the slurry. In some embodiments, wicks 150 may be used to dewater the tailings stream within the previously-filled tailings ponds 130 and/or the tailings pond 122. The wicks 150 may be used with or without the use of the geotextiles 132.

Reclamation of Slurry Ponds

Figure 2:
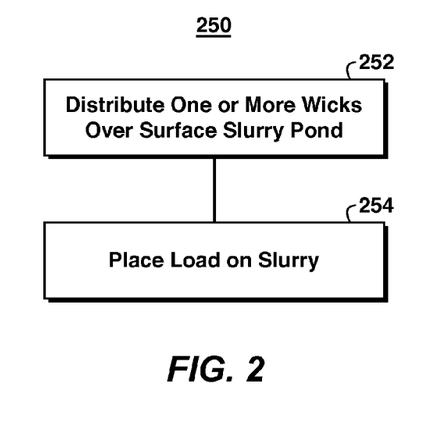
FIG. 2 is a process flow diagram of a method for reclaiming a slurry pond.

FIG. 2 is a process flow diagram of a method 250 for reclaiming a slurry pond. The slurry pond may be a sewage remediation pond, a fly ash impoundment dam, a tailings pond, a waste water treatment pond, a cement processing waste pond, an agricultural waste pond, or a food processing waste pond, among others. The slurry pond includes residues from a plant operation, wherein the residues include suspended solids.

The method 250 begins at block 252 with the distribution of one or more wicks over the surface of the slurry pond. The slurry pond may have a level of supernatant, such as water, above the slurry, which may be oil-sand tailings and may have a shear strength of less than 1000 Pa. The slurry may have a strength of less than 500 Pa, or less than 200 Pa, or less than 50 Pa, or no significant strength. The wicks may contain a semi permeable wall that permits ingress of liquid, while limiting solids migration into the wick, and provide a pathway for the liquid through an inner channel or along fibers. In some embodiments, the wick is a tube or squashed tube composed of fabric or other semi-permeable material. In some embodiments the ends of the tube are sealed. In some embodiments, one or more weights and/or floats are placed on the wicking device to further aid its orientation in the slurry. In some embodiments, the wicks are constructed of materials such that the wicks are self-orienting, i.e., one end of the wick will float near the slurry/supernatant interface and the other end of the wick will extend to a deeper depth within the slurry. Whether weights and/or floats are used or whether the wick is constructed of certain materials to be self-orienting, the wicks may be placed without specialized equipment. Such wicks can be simply discharged or tossed from a vessel, which could be a floating or flying vessel, and will align themselves in the slurry in an approximate vertical orientation. In an embodiment, the buoyancy of the wicks is such that the wick will sink through the supernatant level and at least part of the wick will sink into the slurry below the supernatant. Although it is dependent upon the composition and density of the slurry, a wick will often sink at least one meter into the slurry. In some embodiments, the wick is connected to other wicks. The connection provides a redundant structure and matrix of greater permeable wicks for water removal.

At block 254, a load, such as sand is placed on the slurry. The load increases the pressure within the slurry and allows water within the slurry to enter the wicks at a deeper portion of the wick and travel up the wick and exit the wick at a location near the top of the wick, where the pressure is less than the pressure at the deeper portion of the wick. The higher density of the slurry versus the density of the water also aids in the transmission of the water from the bottom of the wick to the top of the wick. In some embodiments, the wick floats with a portion of the wick sticking out of the slurry, above the load, and into the overlying fluid or supernatant. In this embodiment the application of a load will cause dewatering to occur more rapidly because the water transmitted through the wick proceeds directly into the overlying fluid or supernatant and does not have to travel through the level of sand or coke placed on top of the slurry. In other embodiments, the wick is entirely submerged within the slurry. In an embodiment, the top of the wick floats very near to the interface between the slurry and the overlying fluid or supernatant. In some embodiments, the wick floats with the top out of the slurry but covered by the load. In these embodiments, the dewatering occurs more rapidly because the water transmitted through the wick does not have to penetrate the low-permeability slurry, though it does penetrate the higher permeability cap.

In various embodiments, the method 250 may be used for the dewatering of tailings from the production of oil from oil sands within a tailings pond, as discussed above. The dewatering of the tailings may be used to produce sludge that is over 50 weight percent (wt %) solids derived from thickened tailings, treated tailings, treated mature fine tailings, or composite tailings, among others. The load placed over the material may be sand, treated tailings, mature fine tailings, treated mature fine tailings, coke, or composite tailings, among others.

In some embodiments, the treated flotation tailings and the treated mature fine tailings are dewatered by decanting released water to a drain or a pond. A wick drain may also be placed with one end within the first layer of tailings and the other end within the second layer of tailings in order to facilitate the dewatering process. Further, in some embodiments, flocculated tailings may be placed on top of the tailings in the tailings pond prior to the distribution of the material over the surface of the tailings pond in order to facilitate the dewatering process. In some embodiments, a chemical coagulant may also be placed on top or within the tailings in tailings pond prior the distribution of the material.

Examples

Figure 3A:
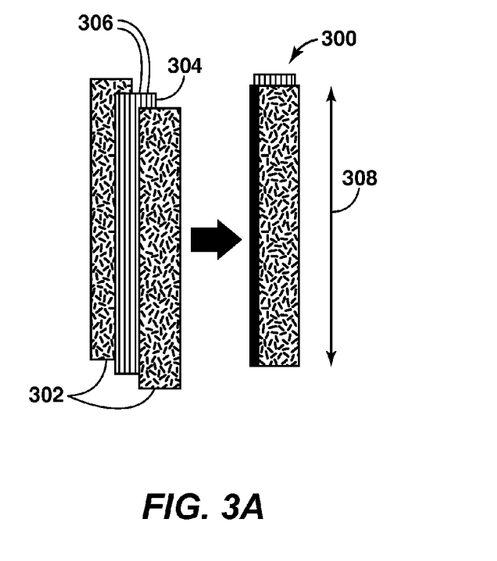
FIG. 3A is an illustration of a wick.

Illustrated in FIG. 3A is an embodiment of a conventional wick drain 300 which comprises a semi-permeable material 302 enclosing a substrate 304 which typically includes channels 306 to allow water movement along the long axis 308 of the wick. Wicks are typically rolled out and cut into strips. The ends are open due to the cut. Because of this opening, such wicks cannot be used on a fluid slurry where the fluid could penetrate the wick, Thus, wicks are typically used in more soil-like applications.

Figure 3B:
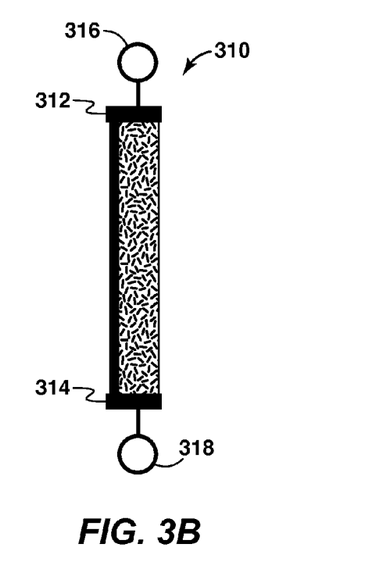
FIG. 3B is an illustration of a wick according to an embodiment of this invention.

Illustrated in FIG. 3B is an embodiment of a wick 310 that has been modified according to the present invention in which the ends 312 and 314 of the wick 310 have been sealed. In addition, a float or buoy 316 is attached to end 312 of the wick 310 and a weight 318 is attached to end 314 so that wick 310 will orient itself in an approximately vertical orientation within the slurry. In another embodiment, floats and/or weights are not used, rather, the wick is constructed of materials such that the wick will float with a relatively vertical orientation within the slurry. The selection of floats, weights, weighted buoys, and/or materials of construction is also made so that the wicks are positioned within the tailings and not within the overlying fluid or supernatant, or at least so that only a portion of the top end of the wick is positioned within the overlying fluid or supernatant. In an embodiment, the wick may comprise an adjustable buoyancy device, such as a diaphragm, so that the level at which the wick floats can be adjusted.

Figure 4A:
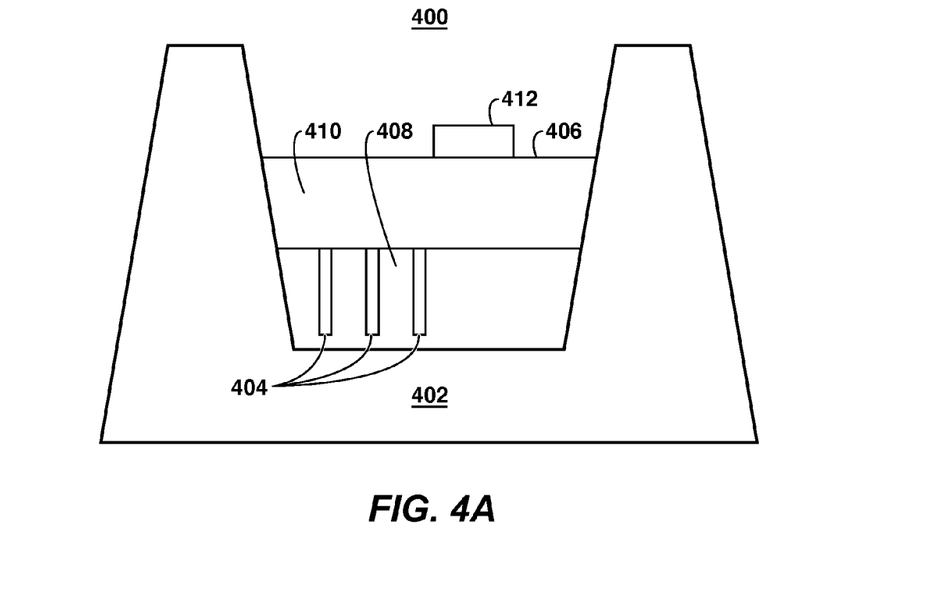
FIG. 4A is a schematic of a tailings pond with one or more wicks placed in the tailings pond.

FIG. 4A is a schematic 400 of a tailings pond 402 that may include a layer of tailings 408, as well as a layer of supernatant 410. The tailings 408 may be, for example, mature fine tailings, while the supernatant 410 may be water. The tailings 408 may have a shear strength of less than 200 Pa. A barge 412, or other vessel, may be used to distribute wicks 404 over the surface 406 of the tailings pond 402, as discussed above. The wicks 404 may orient themselves to a relatively vertical orientation within the tailings 408. Although the top of the wicks 404 are illustrated in FIG. 4*a* to extend to only the interface between the tailings 408 and the supernatant 410, in other embodiments the top of the wicks may stick into the supernatant. In some embodiments, the wicks may be placed prior to a thick supernatant 410 layer existing or forming.

Figure 4B:
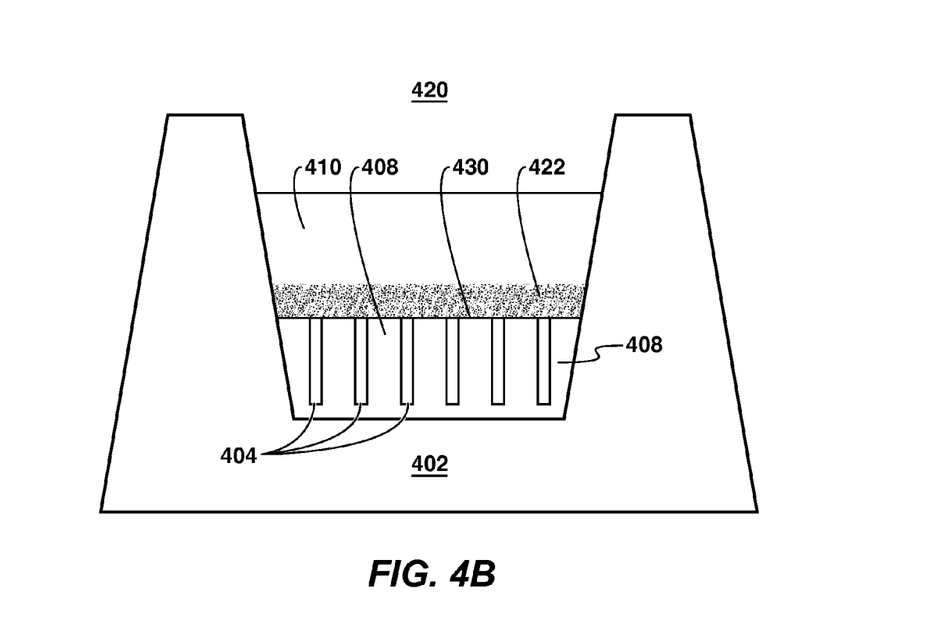
FIG. 4B is a schematic of a tailings pond with one or more wicks placed in the tailings pond and a load placed on the tailings.

FIG. 4B is a schematic 420 of the tailings pond 402 after the wicks 404 have been distributed into the tailings 408. The barge 412, or other vessel, may be used to distribute a load 422, such as sand, over the tailings 408. The load 422 may be distributed over the tailings 408 using a sprayer, split hull vessel, or other similar equipment. The high permeability pathways provided by the wicks 404 and the increased pressure provided by the load 422 contributes towards the improved dewatering of the tailings 408. In some embodiments—not shown in FIG. 4B, the wick 404 floats with a portion of the wick sticking out of the slurry, above the load 422, and into the overlying fluid or supernatant 410. This may cause dewatering to occur more rapidly because the water transmitted through the wick 404 proceeds directly into the overlying fluid or supernatant 410 and does not have to travel through the load 422, consisting of, for example, sand or coke, placed on top of the tailings 408. In other embodiments, the wick 404 is entirely submerged within the tailings 408. In an embodiment, the top of the wick 422 floats very near to the interface 430 between the tailings 408 and the overlying fluid or supernatant 410. In an embodiment, the top of the wick 422 may stick into the load 422.

Figure 5A:
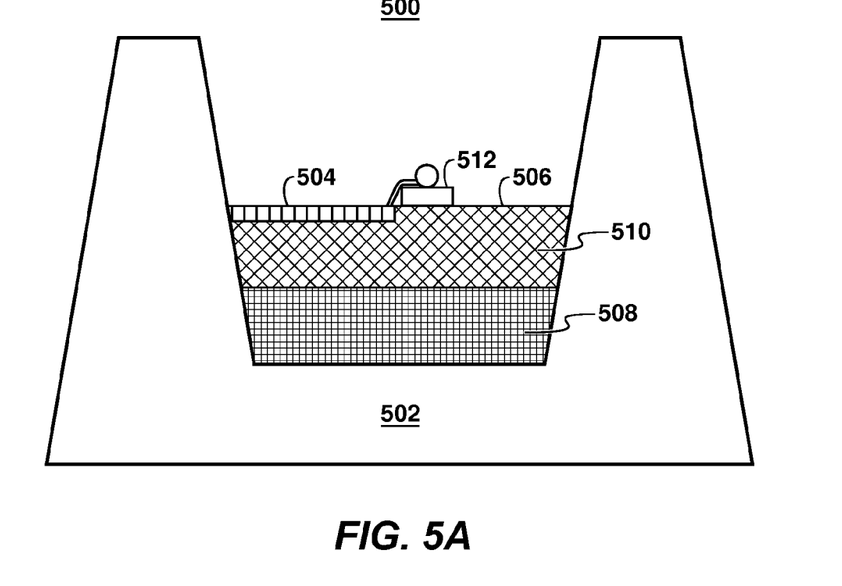
FIG. 5A is a schematic of a tailings pond with a geotextile spread over its surface.

FIG. 5A is a schematic 500 of a tailings pond 502 with a geotextile 504 spread over its surface 506. The tailings pond 502 may include a layer of tailings 508, as well as a layer of supernatant 510. The tailings 508 may be, for example, mature fine tailings, while the supernatant 510 may be water. A barge 512 may be used to distribute the geotextile 504 over the surface 506 of the tailings pond 502, as discussed above. The barge 512 may distribute individual sheets or strips of the geotextile 504 over the surface 506 of the tailings pond 502, for example, as shown in FIG. 5A. The individual sheets or strips may be laid over the tailings pond 502, starting at one end and moving towards the other end. The individual sheets of the geotextile 504 may be distributed such that they overlap with one another to a degree that provides a tight seal that may not be easily penetrated by the supernatant 510.

Figure 5B:
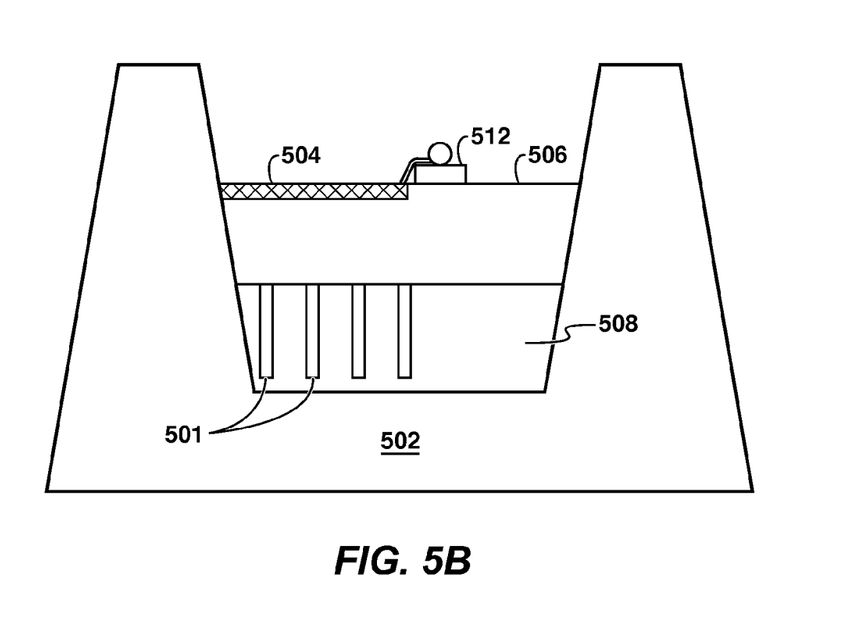
FIG. 5B is a schematic of a tailings pond with a with a geotextile spread over its surface and wicks placed into the tailings pond.

FIG. 5B is a schematic of the tailings pond 502 with one or more wicks 501 placed into the tailings 508 before the geotextile 504 is spread over the surface 506. The barge 512 may be used to place the wicks 501. The placement of the wicks 501 may be performed concurrently with the placement of the geotextile 504, and even from the same barge 512, so long as the wick 501 is placed underneath the geotextile 504. In another embodiment—not shown in FIG. 5B, the wick 501 is attached to the underside of the geotextile 504.

Figure 5C:
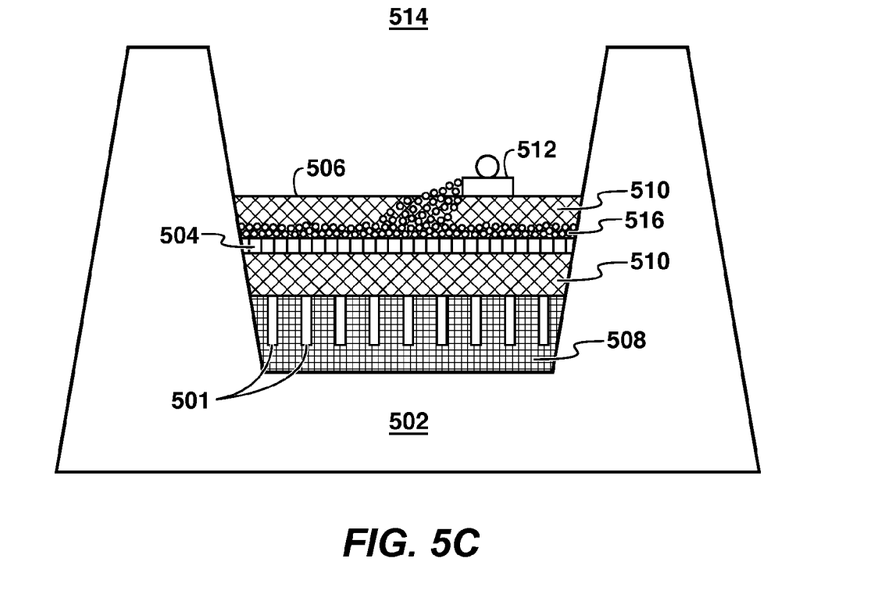
FIG. 5C is a schematic of the tailings pond with a load applied on top of the geotextile.

FIG. 5C is a schematic 514 of the tailings pond 502 with a load 516 applied on top of the geotextile 504 after one or more wicks 501 have been placed into the tailings 508. In some embodiments, the load 516 may be sand that is distributed over the geotextile 504 using the barge 512, as shown in FIG. 5B. The load 516 may also be treated tailings, mature fine tailings, treated mature fine tailings, or composite tailings, among others. In some embodiments, the load 516 is distributed across the geotextile 504 using a sprayer, split hull vessel, or other similar equipment. The load 516 may cause a portion of the layer of supernatant 510 to rise above the geotextile 504, resulting in the dewatering of the underlying tailings 508.

Figure 5D:
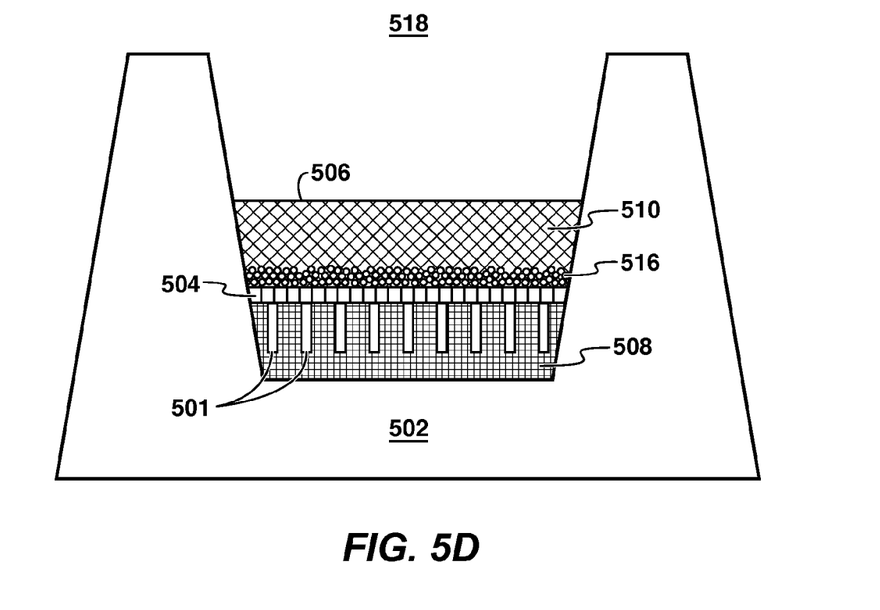
FIG. 5D is a schematic of the tailings pond after the tailings have been dewatered.

FIG. 5D is a schematic 518 of the tailings pond 502 after the tailings 508 have been dewatered. As shown in FIG. 5C, once the dewatering process is complete, a large portion of the layer of supernatant 510 may be above the geotextile 504, while the tailings 508 may remain below the geotextile 504. This may be accomplished by utilizing a geotextile with pores that are not large enough to enable the penetration of the tailings 508.

Embodiments

Embodiments of the invention may include any combinations of the methods and systems shown in the following numbered paragraphs. This is not to be considered a complete listing of all possible embodiments, as any number of variations can be envisioned from the description above.

1. A method for remediating a slurry pond, comprising:
   distributing one or more wicks into the slurry pond
      wherein the one or more wicks buoyantly float in the slurry at least partially below a level of a supernatant.
2. The method of paragraph 1, wherein the slurry has an initial shear strength of less than 200 Pa.
3. The method of paragraph 1 or 2, further comprising placing a load on the slurry.
4. The method of any of the preceding paragraphs, wherein the load is placed on the slurry after one or more wicks are distributed into the slurry pond.
5. The method of any of the preceding paragraphs, wherein at least a portion of the one or more wicks sinks within the slurry to a depth of at least one meter.
6. The method of any of the preceding paragraphs, further comprising placing a geofabric on the slurry wherein the geofabric is positioned above the one or more wicks and below the load.
7. The method of any of the preceding paragraphs, wherein the one or more wicks are attached to the geofabric.

8. The method of any of the preceding paragraphs, wherein placing the load on the slurry comprises distributing sand on top of the slurry.

9. The method of any of the preceding paragraphs, wherein distributing the one or more wicks into the slurry pond comprises using a floating or flying vessel to distribute the one or more wicks.

10. The method of any of the preceding paragraphs, comprising using a mechanism to control a flotation of the one or more wicks so that one end of the one or more wicks floats near an interface between the layer of slurry and the level of supernatant, wherein the mechanism comprises a diaphragm, weights, weighted buoys, floats, or a selection of a density of the material of the one or more wicks, or any combinations thereof 11. The method of any of the preceding paragraphs, wherein the mechanism comprises an adjustable buoyancy device that can allow the flotation of the one or more wicks to be adjusted.

12. The method of any of the preceding paragraphs, wherein one end of the one or more wicks floats slightly above an interface between the layer of slurry and the level of supernatant 13. The method of any of the preceding paragraphs, wherein the one or more wicks comprise a plurality of wicks that are connected together.

14. The method of any of the preceding paragraphs, wherein the load causes the geofabric to sink below a level of a supernatant but to remain above a layer of slurry.

15. The method of any of the preceding paragraphs, wherein placing the load on the geofabric comprises placing sand, treated tailings, mature fine tailings, treated mature fine tailings, coke, or composite tailings, or any combinations thereof, on the geofabric.

16. The method of any of the preceding paragraphs, wherein the wick is sealed at one or both ends.

17. The method of any of the preceding paragraphs, wherein the wick exterior comprises a semi-permeable material and a liquid may only enter into the wick through the semi-permeable material.

18. A slurry dewatering system, comprising:
a slurry pond comprising a supernatant above a slurry,
a wick floating in the slurry with one end of the wick located near the interface of the supernatant and the slurry; and
a load covering the top of the slurry, wherein the load applies an effective stress on the slurry.

19. The system of paragraph 18, wherein the slurry has a shear strength of less than 200 Pa.

20. The system of paragraph 18 or 19, wherein the slurry pond further comprises a geofabric on the slurry wherein the geofabric is positioned above the one or more wicks and below the load.

21. The system of any of the preceding paragraphs, wherein the wick is attached to the geofabric.

22. The system of any of the preceding paragraphs, wherein the load is sand distributed on top of the slurry.

23. The system of any of the preceding paragraphs, wherein a floating or flying vessel is used to place the wick into the slurry pond.

24. The system of any of the preceding paragraphs, further comprising a mechanism to control a flotation of the one or more wicks so that one end of the one or more wicks floats near an interface between the layer of slurry and the level of supernatant, wherein the mechanism comprises a diaphragm, weights, weighted buoys, floats, or a selection of a density of the material of the one or more wicks, or any combinations thereof.

25. The system of any of the preceding paragraphs, wherein the mechanism comprises an adjustable buoyancy device that can allow the flotation of the one or more wicks to be adjusted.

26. The system of any of the preceding paragraphs, wherein the wick comprises a plurality of wicks that are connected together.

27. The system of any of the preceding paragraphs, wherein the load causes the geofabric to sink below a level of a supernatant but to remain above a layer of slurry.

28. The system of any of the preceding paragraphs, wherein the load on the geofabric comprises sand, treated tailings, mature fine tailings, treated mature fine tailings, coke, or composite tailings, or any combinations thereof, on the geofabric.

29. The system of any of the preceding paragraphs, wherein the wick is sealed at one or both ends.

30. The system of any of the preceding paragraphs, wherein the wick exterior comprises a semi-permeable material and a liquid may only enter into the wick through the semi-permeable material.

31. A wick for dewatering a fluid slurry, comprising:
one or more ends that are sealed to prevent ingress of liquid;
a semi-permeable material covering that allows liquid ingress; and
a portion of the wick which will sink within the fluid slurry.

32. The wick of paragraph 31, wherein the ends of the wick are sealed and liquid may enter the wick only through the semi-permeable material.

33. The wick of paragraph 32, comprising using a mechanism to control a flotation of the one or more wicks so that one end of the one or more wicks floats near an interface between the layer of slurry and the level of a supernatant, wherein the mechanism comprises a diaphragm, weights, weighted buoys, floats, or a selection of a density of the material of the one or more wicks, or any combinations thereof.

34. The wick of paragraph 33, wherein the mechanism comprises an adjustable buoyancy device that can allow the flotation of the one or more wicks to be adjusted.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for remediating a slurry pond, comprising:
distributing one or more wicks into the slurry pond wherein the one or more wicks buoyantly float in a slurry at least partially below a level of a supernatant; and
using a mechanism to control a flotation of the one or more wicks so that one end of the one or more wicks floats near an interface between a layer of the slurry and the level of supernatant, wherein the mechanism comprises a diaphragm, weights, weighted buoys, floats, or a selection of a density of the material of the one or more wicks, or any combinations thereof; and wherein one end of the one or more wicks floats slightly above an interface between the layer of the slurry and the level of supernatant.

2. The method of claim 1, wherein the slurry has an initial shear strength of less than 200 Pa.

3. The method of claim 1, further comprising placing a load on the slurry.

4. The method of claim 3, wherein the load is placed on the slurry after one or more wicks are distributed into the slurry pond.

5. The method of claim 4, wherein placing the load on the slurry comprises distributing sand on top of the slurry.

6. The method of claim 3, further comprising placing a geofabric on the slurry wherein the geofabric is positioned above the one or more wicks and below the load.

7. The method of claim 6, wherein the one or more wicks are attached to the geofabric.

8. The method of claim 6, wherein the load is placed on the geofabric and causes the geofabric to sink below a level of a supernatant but to remain above a layer of the slurry.

9. The method of claim 8, wherein placing the load on the geofabric comprises placing sand, treated tailings, mature fine tailings, treated mature fine tailings, coke, or composite tailings, or any combinations thereof, on the geofabric.

10. The method of claim 1, wherein at least a portion of the one or more wicks sinks within the slurry to a depth of at least one meter.

11. The method of claim 1, wherein distributing the one or more wicks into the slurry pond comprises using a floating or flying vessel to distribute the one or more wicks.

12. The method of claim 1, wherein the mechanism comprises an adjustable buoyancy device that can allow the flotation of the one or more wicks to be adjusted.

13. The method of claim 1, wherein the one or more wicks comprise a plurality of wicks that are connected together.

14. The method of claim 1, wherein the one or more wicks are sealed at one or both ends.

15. The method of claim 14, wherein the exterior of the one or more wicks comprises a semi-permeable material and a liquid may only enter into the one or more wicks through the semi-permeable material.

* * * * *